United States Patent
Uesugi et al.

(10) Patent No.: US 10,784,676 B2
(45) Date of Patent: *Sep. 22, 2020

(54) ELECTRICALLY-DRIVEN WORKING APPARATUS AND METHOD FOR PROTECTING BATTERY OF ELECTRICALLY-DRIVEN WORKING APPARATUS

(71) Applicant: MAKITA CORPORATION, Anjo-shi, Aichi (JP)

(72) Inventors: Hiroki Uesugi, Anjo (JP); Takuya Umemura, Anjo (JP); Takayoshi Endo, Anjo (JP); Masafumi Noda, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 65 days.

This patent is subject to a terminal disclaimer.

(21) Appl. No.: 16/181,449

(22) Filed: Nov. 6, 2018

(65) Prior Publication Data

US 2019/0074683 A1 Mar. 7, 2019

Related U.S. Application Data

(63) Continuation of application No. 14/596,600, filed on Jan. 14, 2015, now Pat. No. 10,177,559.

(30) Foreign Application Priority Data

Jan. 15, 2014 (JP) ................................. 2014-005294

(51) Int. Cl.
*H02H 7/18* (2006.01)
*H02J 7/00* (2006.01)
(Continued)

(52) U.S. Cl.
CPC ............. *H02H 7/18* (2013.01); *H02J 7/0031* (2013.01); *H02J 7/0063* (2013.01); *H02H 3/044* (2013.01); *H02H 3/05* (2013.01); *H02J 7/00306* (2020.01)

(58) Field of Classification Search
CPC .......... H02H 1/06; H02H 3/044; H02H 3/05; H02H 3/202; H02H 7/18; H02J 7/0031;
(Continued)

(56) References Cited

U.S. PATENT DOCUMENTS

| 6,577,105 | B1 | 6/2003 | Iwaizono |
| 6,879,133 | B1 | 4/2005 | Geren |

(Continued)

FOREIGN PATENT DOCUMENTS

| EP | 2 605 362 A1 | 6/2013 |
| JP | 2006-109596 A | 4/2006 |

(Continued)

OTHER PUBLICATIONS

Jan. 28, 2020 Office Action issued in European Patent Application No. 15151163.1.

(Continued)

*Primary Examiner* — Kevin J Comber
(74) *Attorney, Agent, or Firm* — Oliff PLC (57) ABSTRACT

An electrically-driven working apparatus in one aspect of an embodiment of the present disclosure comprises: a battery; an abnormality detection unit; a power supply path; a first disconnection unit; a second disconnection unit; and a control unit. The control unit activates the first disconnection unit to disconnect the power supply path if either of an overload or an over discharge of the battery is detected by the abnormality detection unit, and subsequently determines whether discharge from the battery has stopped after activating the first disconnection unit, and activates the second
(Continued)

disconnection unit to disconnect the power supply path if discharge from the battery has not stopped.

6 Claims, 7 Drawing Sheets

(51) Int. Cl.
*H02H 3/04* (2006.01)
*H02H 3/05* (2006.01)

(58) Field of Classification Search
CPC ............... H02J 7/0063; H02J 7/00306; H02J 2007/004
USPC ...................................... 361/91.1
See application file for complete search history.

(56) References Cited

U.S. PATENT DOCUMENTS

| | | | |
|---|---|---|---|
| 7,492,124 | B2 | 2/2009 | Johnson et al. |
| 2003/0099075 | A1 | 5/2003 | Pannwitz |
| 2005/0073282 | A1 | 4/2005 | Carrier et al. |
| 2005/0221164 | A1* | 10/2005 | Kawazu ............... H01M 2/34 429/61 |
| 2006/0139006 | A1 | 6/2006 | Wang et al. |
| 2007/0108940 | A1 | 5/2007 | Sainomoto et al. |
| 2007/0159138 | A1 | 7/2007 | Furuuchi et al. |
| 2007/0188148 | A1 | 8/2007 | Kawasumi et al. |
| 2010/0085010 | A1* | 4/2010 | Suzuki ............... H01M 2/30 320/132 |
| 2011/0019326 | A1 | 1/2011 | Odaohhara |
| 2011/0273137 | A1 | 11/2011 | Nakatsuji et al. |
| 2012/0162840 | A1 | 6/2012 | Noda |
| 2012/0225328 | A1 | 9/2012 | Nakanouchi et al. |
| 2013/0163134 | A1 | 6/2013 | Ji |
| 2013/0181681 | A1 | 7/2013 | Mukai et al. |
| 2013/0241496 | A1 | 9/2013 | Kurayama |

FOREIGN PATENT DOCUMENTS

| | | |
|---|---|---|
| JP | 2007-215310 A | 8/2007 |
| JP | 2011-023317 A | 2/2011 |
| JP | 2012-135849 A | 7/2012 |
| JP | 2012-231649 A | 11/2012 |

OTHER PUBLICATIONS

May 28, 2019 Office Action issued in Japanese Patent Application No. 2017-131900.
Jul. 13, 2015 Extended Search Report issued in European Patent Application No. 15151163.1.
Jul. 13, 2015 Extended European Search Report issued in European Patent Application No. 15151163.1.
Jun. 13, 2017 Office Action issued in U.S. Appl. No. 14/596,600.
Dec. 29, 2017 Office Action issued in U.S. Appl. No. 14/596,600.
Jul. 3, 2018 Office Action issued in Japanese Patent Application No. 2017-131900.
Jul. 27, 2018 Notice of Allowance issued in U.S. Appl. No. 14/596,600.
Jan. 8, 2019 Office Action issued in Japanese Patent Application No. 2017-131900.
Sep. 18, 2019 Office Action issued in European Patent Application No. 15151163.1.
May 25, 2020 Office Action issued in European Patent Application No. 15151163.1.

\* cited by examiner

ELECTRICALLY-DRIVEN WORKING APPARATUS AND METHOD FOR PROTECTING BATTERY OF ELECTRICALLY-DRIVEN WORKING APPARATUS

CROSS-REFERENCE TO RELATED APPLICATIONS

This is a Continuation of application Ser. No. 14/596,600 filed Jan. 14, 2015, which claims the benefit of Japanese Patent Application No. 2014-005294 filed Jan. 15, 2014. The disclosures of the prior applications are hereby incorporated by reference herein in their entireties.

BACKGROUND

The present disclosure relates to an electrically-driven working apparatus that comprises a battery.

As disclosed, for example, in Japanese Unexamined Patent Application Publication No. 2012-135849, an electrically-driven working apparatus, such as an electric power tool or an electric vacuum cleaner, is provided with a protective function to disconnect a power supply path from a battery to an actuator to thereby prevent deterioration of the battery when an overload or an over discharge of the battery is detected during operation of the electrically-driven working apparatus.

SUMMARY

The aforementioned protective function, however, is merely configured to turn off a disconnection element (such as an FET) provided in the power supply path. Accordingly, if a short-circuit fault has occurred in the disconnection element, the power supply path cannot be disconnected by the protective function, and the resulting continued discharge of the battery may cause deterioration of the battery.

In one aspect of an embodiment of the present disclosure, it is desirable to more securely protect a battery of an electrically-driven working apparatus.

The electrically-driven working apparatus in one aspect of the embodiment of the present disclosure comprises: a battery; an abnormality detection unit; a power supply path configured to be connected to the battery; a first disconnection unit; a second disconnection unit; and a control unit. The abnormality detection unit detects either an overload or an over discharge of the battery. Each of the first disconnection unit and the second disconnection unit is provided in the power supply path to be operable to disconnect the power supply path. The control unit activates the first disconnection unit to disconnect the power supply path if either of the overload or the over discharge is detected by the abnormality detection unit, subsequently determines whether discharge from the battery has stopped after activating the first disconnection unit, and activates the second disconnection unit to disconnect the power supply path if discharge from the battery has not stopped.

In the above electrically-driven working apparatus, it is possible to disconnect the power supply path by the second disconnection unit if the power supply path cannot be disconnected by the first disconnection unit due to, for example, a short-circuit fault in the first disconnection unit or a failure in a disconnection signal path from the control unit to the first disconnection unit. Accordingly, it is possible to more surely stop discharge from the battery to thereby protect the battery if an overload or an over discharge of the battery is detected by the abnormality detection unit.

Also, in the electrically-driven working apparatus, the first disconnection unit and the second disconnection unit do not concurrently operate to disconnect the power supply path; the second disconnection unit operates when the first disconnection unit, which operates preferentially, cannot stop discharge from the battery. Accordingly, it is possible to reduce the frequency of disconnection of the power supply path by the second disconnection unit to thereby reduce a failure rate of the second disconnection unit.

The control unit may determine whether discharge from the battery has stopped based on at least one of a current flowing in the power supply path, a change in voltage of the battery, or a change in temperature of one of the battery and the electrically-driven working apparatus.

If the power supply path cannot be disconnected by the first disconnection unit, a load current continues to flow in the power supply path, the voltage of the battery is reduced, and the temperature of the battery or the electrically-driven working apparatus is increased.

Among these parameters, the current flowing in the power supply path is rapidly reduced to be zero ultimately when the power supply path is disconnected. Thus, it is possible to determine whether discharge from the battery has stopped by comparing a detected value of the current and a preset threshold.

The voltage or the temperature of the battery shows different changes in detected value between when the power supply path has been disconnected by the first disconnection unit and when the power supply path has not been disconnected by the first disconnection unit. Thus, after the power supply path is disconnected by the first disconnection unit, a value of the current flowing in the power supply path, a value of the voltage of the battery, or a value of the temperature of the battery or the electrically-driven working apparatus is detected, and it is determined whether discharge from the battery has stopped based on the detected value of the current, a change in the detected value of the voltage of the battery, or a change in the detected value of the temperature.

As a result, a more accurate determination can be made as to whether discharge from the battery has stopped after disconnecting the power supply path by the first disconnection unit, and thus activation of the second disconnection unit can be reduced to the necessary minimum to thereby reduce the failure rate of the second disconnection unit.

The electrically-driven working apparatus may comprise: a main body; and a battery pack configured to be connected to the main body to supply electric power to the main body. In this case, the first disconnection unit may be provided to the main body, whereas the battery and the second disconnection unit may be provided to the battery pack.

In the electrically-driven working apparatus configured as above, by using the first disconnection unit also as a switching element (for example, a switching element to control a conduction current to a motor) to drive an actuator in the electrically-driven working apparatus, the battery can be smaller in size, and cost reduction can be achieved.

In a case where the electrically-driven working apparatus comprises the main body and the battery pack, the main body may comprise, in addition to the actuator and the switching element to drive the actuator, for example, a control unit to drive-control the switching element, an indication unit to indicate a remaining power of the battery, an illumination unit to illuminate a working area.

In this case, if the electrically-driven working apparatus is configured such that the first disconnection unit is provided to the battery pack so as to disconnect the power supply path from the battery pack to the main body, the power supply path to the control unit, the indication unit, the illumination unit, or the like might also be disconnected. However, by providing the first disconnection unit to the main body, power supply to the control unit, the indication unit, the illumination unit, or the like can be continued when the power supply path to the actuator is disconnected by the first disconnection unit.

The second disconnection unit, after once disconnecting the power supply path, may maintain the disconnection, and may cancel the disconnection of the power supply path when the battery pack is detached from the main body. Alternatively, the second disconnection unit, after once disconnecting the power supply path, may maintain the disconnection, and may cancel the disconnection of the power supply path when the battery pack is attached to a charger to charge the battery (in other words, when the battery pack is detached from the main body of the electrically-driven working apparatus).

In either case, it is possible to prevent or inhibit disconnection of the power supply path by the second disconnection unit from being cancelled to thereby allow the actuator in the main body to be driven, while the battery pack and the main body are connected.

The second disconnection unit may comprise a self-holding switching element that can maintain a disconnected state once the state occurs.

The control unit may be provided to the battery pack. In this case, the second disconnection unit may comprise at least one switching element configured to connect or disconnect the power supply path according to a control signal from the control unit. Then, it is possible to control the second disconnection unit by the control signal from the control unit to thereby connect or disconnect the power supply path. The control unit may provide the second disconnection unit with a control signal to cancel the disconnection of the power supply path when the battery pack is detached from the main body, or when the battery pack is connected to the charger. The at least one switching element may comprise a plurality of switching elements that are connected in parallel to each other.

The electrically-driven working apparatus may further comprise a third disconnection unit that is provided in the power supply path and is operable to disconnect the power supply path. In this case, the control unit may determine whether discharge from the battery has stopped after activating the second disconnection unit, and may activate the third disconnection unit to disconnect the power supply path if discharge from the battery has not stopped.

In the electrically-driven working apparatus configured as above, if discharge from the battery cannot be stopped although the first disconnection unit and the second disconnection unit are sequentially activated, it is possible to disconnect the power supply path by the third disconnection unit to thereby stop discharge from the battery.

Thus, according to the electrically-driven working apparatus, it is possible to more surely stop discharge from the battery to thereby protect the battery if an overload or an over discharge of the battery is detected by the abnormality detection unit.

In a case where the electrically-driven working apparatus comprises the main body and the battery pack, the third disconnection unit may be provided to the battery pack together with the battery and the second disconnection unit.

In this case, the electrically-driven working apparatus may further comprise a state determination unit configured, when the battery pack is detached from any of the main body and a charger to charge the battery, to generate a first voltage if both of the second disconnection unit and the third disconnection unit are normal, and to generate a second voltage different from the first voltage if at least one of the second disconnection unit or the third disconnection unit is not normal.

In the electrically-driven working apparatus configured as above, it is possible to determine that both of the second disconnection unit and the third disconnection unit are normal when the state determination unit generates the first voltage, whereas it is possible to determine that at least one of the second disconnection unit or the third disconnection unit is not normal when the state determination unit generates the second voltage.

The third disconnection unit may comprise at least one protection circuit that comprises a fuse portion to disconnect the power supply path by melting and a heater portion to generate heat by electrical conduction to thereby melt the fuse portion. In this case, the control unit may cause electrical conduction from the battery to the heater portion to thereby melt the fuse portion when activating the third disconnection unit to disconnect the power supply path.

In the electrically-driven working apparatus configured as above, it is possible to disable use of the battery pack, to which the third disconnection unit is provided, as a power source of the main body by disconnecting the power supply path by the third disconnection unit if it is not possible to disconnect the power supply path by the first disconnection unit and the second disconnection unit to thereby stop discharge from the battery.

The control unit may be further configured to, when activating the third disconnection unit to disconnect the power supply path, wait until the voltage of the battery returns to a specified voltage that allows supply of electric power sufficient to melt the fuse portion to the heater portion if the voltage of the battery has not reached the specified voltage, and to cause electrical conduction from the battery to the heater portion if the voltage of the battery has returned to the specified voltage. In this case, it is possible to surely melt the fuse portion by electrical conduction from the battery to the heater, to thereby disable use of the battery pack thereafter.

Another aspect of the embodiment of the present disclosure is a method for protecting a battery of an electrically-driven working apparatus. The method comprises: providing a first disconnection unit and a second disconnection unit in a power supply path, which is to be connected to the battery, in the electrically-driven working apparatus, each of the first disconnection unit and the second disconnection unit being operable to disconnect the power supply path; detecting one of an overload and an over discharge of the battery; activating the first disconnection unit when the one of the overload and the over discharge is detected; determining whether discharge from the battery has stopped after activating the first disconnection unit; and activating the second disconnection unit if discharge from the battery has not stopped after activating the first disconnection unit. According to the method, the battery of the electrically-driven working apparatus can be more surely protected.

The method may further comprise: providing, in the power supply path, a third disconnection unit that is operable to disconnect the power supply path; determining whether discharge from the battery has stopped after activating the second disconnection unit; and activating the third disconnection unit if discharge from the battery has not stopped after activating the second disconnection unit. According to such method, it is possible to disconnect the power supply path by the third disconnection unit to thereby stop discharge from the battery if discharge from the battery cannot be stopped by sequentially activating the first disconnection unit and the second disconnection unit.

BRIEF DESCRIPTION OF THE DRAWINGS

An exemplary embodiment of the present disclosure will now be described by way of example with reference to the accompanying drawings, in which.

DETAILED DESCRIPTION OF THE PREFERRED EMBODIMENTS

It is obvious that the embodiment of the present disclosure should not be limited to the exemplary embodiment described below, and may be practiced in various forms within the technical scope of the present disclosure.
[Configuration of Entire Electric Power Tool]

Figure 1:
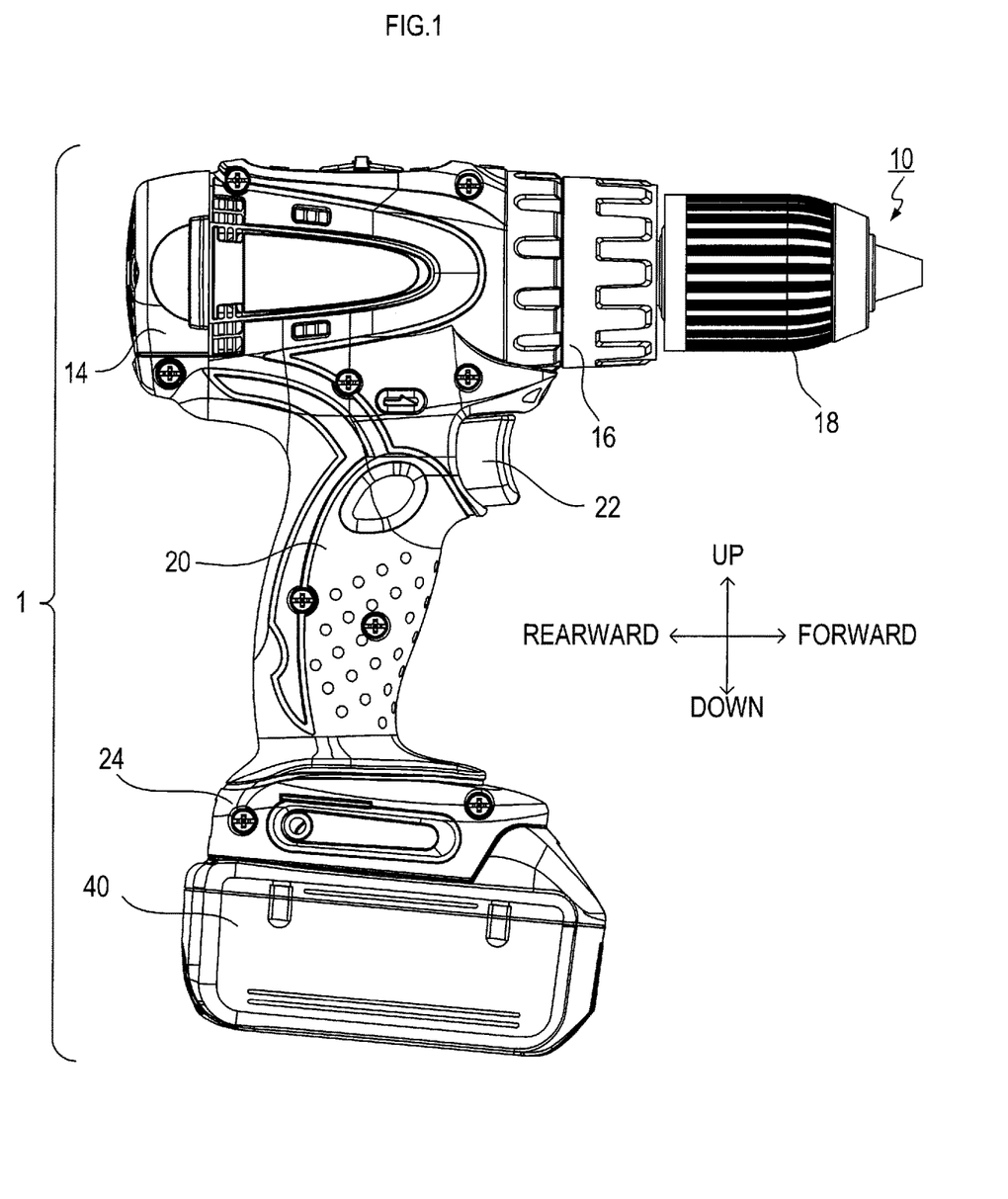
FIG. 1 is a side elevation view showing a configuration of an entire electric power tool according to the exemplary embodiment.

As shown in FIG. 1, an electric power tool 1 according to the present embodiment is configured as a so-called driver drill. The electric power tool 1 comprises a main body 10 and a battery pack 40 that is detachably attached to the main body 10 to supply electric power to the main body 10.

The main body 10 comprises a motor housing 14, a gear housing 16 located forward of the motor housing 14, a drill chuck 18 located forward of the gear housing 16, and a handle grip 20 located below the motor housing 14.

The motor housing 14 houses a motor 30 (see FIG. 3) that generates a driving force to rotationally drive the drill chuck 18. The gear housing 16 houses a gear mechanism (not shown) that transmits the driving force of the motor 30 to the drill chuck 18.

The drill chuck 18 comprises an attachment mechanism (not shown) to detachably attach a tool bit (not shown) to a front end of the drill chuck 18. The handle grip 20 is formed such that a user of the electric power tool 1 can grip the handle grip 20 with one hand. At an upper front of the handle grip 20, there is provided a trigger switch 22 for a user of the electric power tool 1 to drive and stop the motor 30.

Also, at a lower end of the handle grip 20, there is provided a battery pack attachment unit 24 to allow attachment of the battery pack 40 in a detachable manner. The battery pack attachment unit 24 is configured such that, when a user of the electric power tool 1 slides the battery pack 40 in the forward direction of the main body 10, the battery pack 40 can be detached from the battery pack attachment unit 24.

Figure 2:
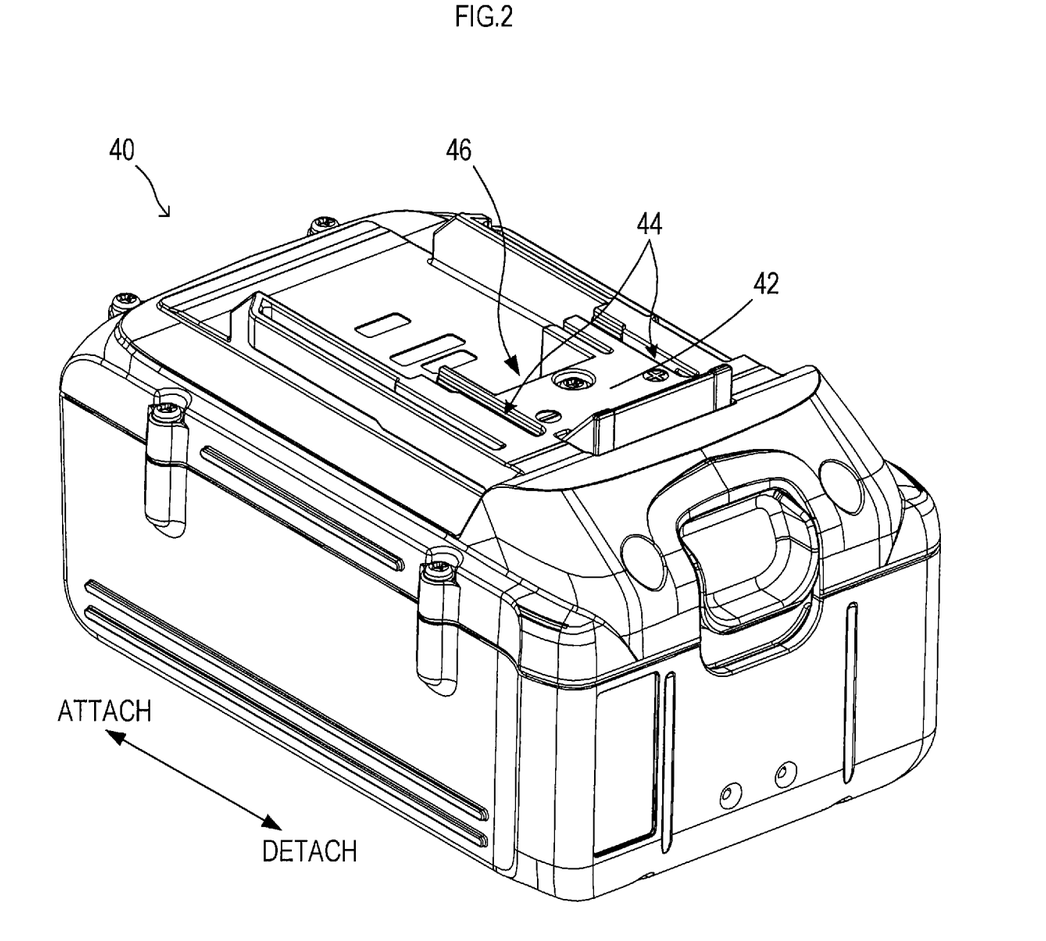
FIG. 2 is a perspective view showing an appearance of a battery pack to be attached to a main body of the electric power tool.

As shown in FIG. 2, a connector portion 42 for connection to the battery pack attachment unit 24 of the main body 10 or to a charger 80 (see FIG. 4) is provided in an upper part of the battery pack 40. Also, the connector portion 42 comprises a power supply terminal section 44 and a connection terminal section 46 for electrical connection to the main body 10 or the charger 80.

The battery pack 40 houses a battery 50 (see FIG. 3), which is rechargeable and dischargeable through the connector portion 42, in a case (see FIG. 2) having the connector portion 42. When the battery pack 40 is attached to the main body 10 through the connector portion 42, the battery 50 is electrically connected to an internal circuit of the main body 10 through the power supply terminal section 44 and the connection terminal section 46 provided to the connector portion 42, and is allowed to provide direct current (DC) power to the main body 10 (see FIG. 3).

Figure 3:
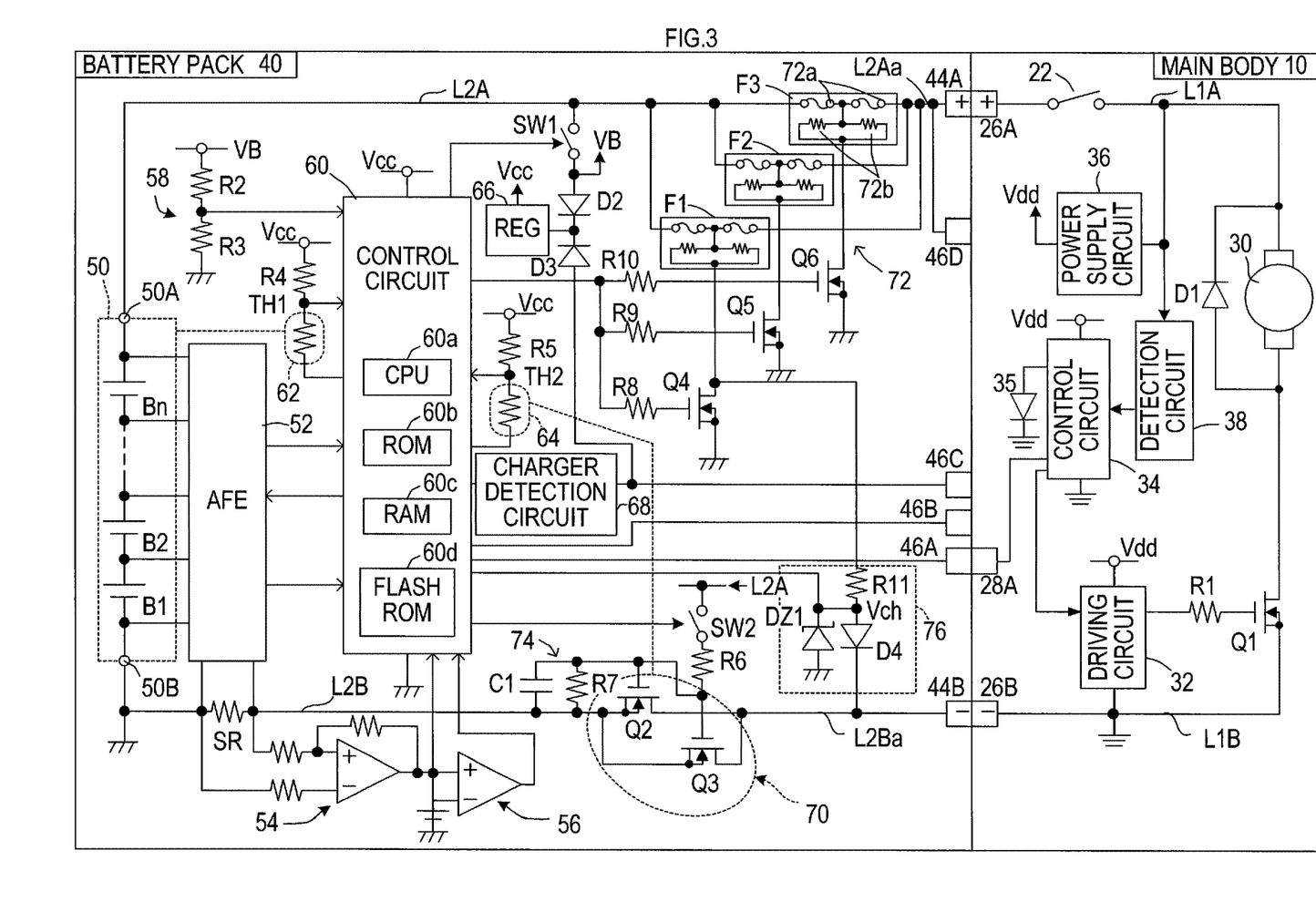
FIG. 3 is a block diagram showing a circuit configuration of the entire electric power tool including the battery pack.

When the battery pack 40 is attached to the charger 80 (see FIG. 4) through the connector portion 42, the battery 50 is electrically connected to a charging circuit in the charger 80 through the power supply terminal section 44 and the connection terminal section 46, and is allowed to be charged receiving DC power from the charger 80.
[Circuit Configuration of Main Body of Electric Power Tool]

As shown in FIG. 3, the main body 10 comprises a positive terminal 26A and a negative terminal 26B that are to be connected to the power supply terminal section 44 of the battery pack 40, and a connection terminal 28A that is to be connected to the connection terminal section 46 of the battery pack 40.

The positive terminal 26A is connected to one end of the motor 30 through the trigger switch 22 and a positive power supply line L1A; the negative terminal 26B is connected to the other end of the motor 30 through a switching element Q1, which is for controlling conduction to the motor 30, and through a negative power supply line L1B.

In the present embodiment, the motor 30 may be, for example, a brushed DC motor. In this case, when the trigger switch 22 is in an ON state, the switching element Q1 is turned on through a driving circuit 32, and thereby the motor 30 is energized and rotates.

A diode (a so-called flywheel diode) D1 that is configured to regenerate a counter electromotive force, which is generated in the negative power supply line L1B when the switching element Q1 is turned off, in the positive power supply line L1A is connected to the motor 30 in parallel. The switching element Q1 may be an n-channel Metal-Oxide-Semiconductor Field-Effect Transistor (MOSFET). In this case, a drive signal may be inputted from the drive circuit 32 to a gate of the switching element Q1 through a resistor R1.

The main body 10 comprises a control circuit 34. The control circuit 34 controls the switching element Q1 through the drive circuit 32 in accordance with instructions from the battery pack 40. The control circuit 34 of the present embodiment comprises a microcomputer comprising a CPU, a ROM, and a RAM.

The main body 10 also comprises a power supply circuit 36 and a detection circuit 38. The power supply circuit 36 receives electric power from the battery pack 40 and supplies the electric power to the control circuit 34 and the drive circuit 32 when the trigger switch 22 is in an on state. The detection circuit 38 detects an operated amount of the trigger switch 22.

When the control circuit 34 is activated by receiving electric power (a power supply voltage Vdd) from the power supply circuit 36, the control circuit 34 informs a later-described control circuit 60 in the battery pack 40 that the battery pack 40 has been attached to the main body 10 by communicating with the control circuit 60. The control circuit 34 outputs a control signal to the drive circuit 32 according to the operated amount of the trigger switch 22 detected by the detection circuit 38, to thereby control a rotation speed of the motor 30. An LED 35 is connected to the control circuit 34, and the control circuit 34 lights the LED 35 during operation to inform a user of the ongoing operation.

[Circuit Configuration of Battery Pack]

The battery pack 40 comprises a positive terminal 44A and a negative terminal 44B provided to the power supply terminal section 44, connection terminals 46A to 46D provided to the connection terminal section 46, the battery 50, an Analog Front End (AFE) 52 for detecting a state of the battery, and the control circuit 60.

A positive terminal 50A of the battery 50 is connected to the positive terminal 44A through a positive power supply line L2A. A negative terminal 50B of the battery 50 is connected to the negative terminal 44B through a negative power supply line L2B. The negative terminal 50B of the battery 50 is connected to a ground line in the battery pack 40. In the positive power supply line L2A, a path from a disconnection switch 72 to the positive terminal 44A is defined as a path L2Aa. In the negative power supply line L2B, a path from a disconnection switch 70 to the negative terminal 44B is defined as a path L2Ba.

When the battery pack 40 is attached to the main body 10, the positive terminal 44A is connected to the positive terminal 26A of the main body 10, the negative terminal 44B is connected to the negative terminal 26B of the main body 10, and the connection terminal 46A is connected to the connection terminal 28A of the main body 10.

The control circuit 60 comprises a microcomputer comprising a CPU 60a, a ROM 60b, and a RAM 60c in a similar manner as the control circuit 34 in the main body 10. The control circuit 60 also comprises a flash ROM 60d, which is a non-volatile memory.

When the battery pack 40 is attached to the main body 10, the control circuit 60 is connected to the control circuit 34 in the main body 10 through the connection terminal 46A and the connection terminal 28A, and is allowed to perform two-way communication with the control circuit 34.

The connection terminals 46B to 46D are connected to a connection terminal section of the charger 80 when the battery pack 40 is attached to the charger 80. Accordingly, the connection terminals 46B to 46D are open when the battery pack 40 is attached to the main body 10.

The connection terminal 46D is connected to the positive power supply line L2A similarly to the positive terminal 44A. Accordingly, when the battery pack 40 is attached to the charger 80 and a charging voltage is applied from the charger 80 between the connection terminal 46D and the negative power supply line L2B, a charging current to the battery 50 is supplied to the connection terminal 46D.

The battery 50 comprises a plurality of serially connected battery cells B1, B2, . . . , and Bn between the positive terminal 50A and the negative terminal 50B. The serially connected battery cells B1, B2, . . . , and Bn generate a drive voltage (for example, a DC voltage of 36V) to drive the motor 30. The battery cells B1, B2, . . . , and Bn may be lithium ion batteries, each generating a DC voltage of 3.6V.

The AFE 52 is an analog circuit. The AFE 52 detects values of cell voltages of the battery cells B1, B2, . . . , and Bn in accordance with instructions from the control circuit 60. The AFE 52 also detects a value of a charging current to the battery 50 and a value of a discharging current from the battery 50 through a current detection resistor SR provided in the negative power supply line L2B. The values of the cell voltages, the value of the charging current, and the value of the discharging current detected by the AFE 52 are inputted to the control circuit 60.

A discharging current detection circuit 54 to detect a value of a discharging current is connected to the current detection resistor SR. An overload determination circuit 56 to determine whether the value of the discharging current has reached a specified overload determination threshold is connected to the discharging current detection circuit 54. Both of a detection result by the discharging current detection circuit 54 and a determination result by the overload determination circuit 56 are inputted to the control circuit 60.

The discharging current detection circuit 54 detects the value of the discharging current from a difference in electric potential between both ends of the current detection resistor SR. The discharging current detection circuit 54 may be a differential amplifier circuit comprising an operational amplifier. The overload determination circuit 56 may be a comparator that compares an output voltage from the discharging current detection circuit 54 and a reference voltage as the overload determination threshold.

The battery pack 40 further comprises a battery voltage detection circuit 58 to detect a value of a battery voltage VB, a thermistor 62 to detect a value of a cell temperature TH1 of the battery 50, and a thermistor 64 to detect a value of a temperature TH2 of a substrate on which the aforementioned various circuits and power supply lines are formed. The value of the battery voltage VB, the value of the cell temperature TH1, and the value of the substrate temperature TH2 detected by these components are all inputted to the control circuit 60.

The battery voltage detection circuit 58 is configured to divide a voltage (the battery voltage VB) between the both terminals of the battery 50 by resistors R2 and R3, and to input the divided voltage to the control circuit 60. The thermistor 62, which is a temperature detection element, divides a power supply voltage Vcc generated by a regulator 66 in the battery pack 40 between the thermistor 62 and a resistor R4, and inputs the divided voltage to the control circuit 60 as a detection result of the cell temperature TH1. The thermistor 64, which is a temperature detection element, divides the power supply voltage Vcc between the thermistor 64 and a resistor R5, and inputs the divided voltage to the control circuit 60 as a detection result of the substrate temperature TH2.

The regulator 66 receives electric power from the positive power supply line L2A or a later-described charger 80, and generates the aforementioned power supply voltage Vcc. The aforementioned power supply voltage Vcc is a DC constant voltage to be used for driving internal circuits of the battery pack 40.

A cathode of a diode D2 and a cathode of a diode D3 are connected to an input side of the regulator 66. An anode of the diode D2 is connected to the positive power supply line L2A through a shutdown switch SW1, whereas an anode of the diode D3 is connected to a connection terminal 46C. The connection terminal 46C is provided to receive a charger-side power supply voltage Vdd from the later-described charger 80.

The shutdown switch SW1 is configured to be turned off by a shutdown signal outputted from the control circuit 60. The shutdown switch SW1 is maintained in an on state while the battery 50 is normal.

When discharge of the battery 50 progresses and the battery voltage VB is substantially lowered because, for example, the battery pack 40 is left untouched for a long time, the control circuit 60 outputs a shutdown signal to the shutdown switch SW1 to turn off the shutdown switch SW1 in order to inhibit or prevent over discharge of the battery 50.

Accordingly, in a normal state where the shutdown switch SW1 is in the on state, a larger one of the battery voltage VB supplied from the battery 50 through the positive power supply line L2A and the power supply voltage Vdd supplied from the charger 80 is inputted to the regulator 66.

In contrast, if the battery pack 40 is not attached to the charger 80 while the shutdown switch SW1 is in an off state, the regulator 66 cannot generate a power supply voltage Vcc, and thus the control circuit 60 stops its operation.

However, if the battery pack 40 is attached to the charger 80 while the shutdown switch SW1 is in the off state, and a power supply voltage Vdd is supplied from the charger 80 to the connection terminal 46C, the regulator 66 generates a power supply voltage Vcc based on the power supply voltage Vdd. As a result, the control circuit 60 is activated, and charging from the charger 80 to the battery 50 is started under the control of the control circuit 60.

The battery pack 40 also comprises a charger detection circuit 68 and the aforementioned disconnection switches 70 and 72. The charger detection circuit 68 detects attachment of the battery pack 40 to the charger 80 based on the power supply voltage Vdd inputted to the connection terminal 46C. The disconnection switch 70 operates to disconnect the negative power supply line L2B. The disconnection switch 72 operates to disconnect the positive power supply line L2A.

The disconnection switch 70 of the present embodiment comprises a pair of switching elements Q2 and Q3. More specifically, the switching elements Q2 and Q3 are connected in parallel to each other by interconnecting the drain of the switching element Q2 and the drain of the switching element Q3, whereas interconnecting the source of the switching element Q2 and the source of the switching element Q3. The pair of parallely connected switching elements Q2 and Q3 is provided on the negative power supply line L2B with these drains being disposed on a negative terminal 44B side of the battery pack 40 and these sources being disposed on a negative terminal 50B side of the battery 50.

The switching elements Q2 and Q3 each may be an n-channel MOSFET. In this case, the switching elements Q2 and Q3 can be turned on/off simultaneously by a common bias circuit 74 provided between the positive power supply line L2A and the negative power supply line L2B.

The bias circuit 74 may comprise a series circuit of a control switch SW2 to be turned on/off by a signal from the control circuit 60, a resistor R6, and a resistor R7. An end of this series circuit on the side of the control switch SW2 may be connected to the positive power supply line L2A, whereas an end of this series circuit on the side of the resistor R7 may be connected to the negative power supply line L2B.

A connection point between the resistor R6 and the resistor R7 is connected to gates of the switching elements Q2 and Q3, and also a capacitor C1 to stabilize a gate voltage may be connected to the resistor R7 in parallel. In this case, when the control switch SW2 is turned on, and a specified bias voltage is applied to the gates of the switching elements Q2 and Q3 and thereby the switching elements Q2 and Q3 are turned on, the negative power supply line L2B is connected and a charging current to the battery 50 or a discharging current from the battery 50 flows in the negative power supply line L2B.

In this situation, since the charging current or the discharging current is shunted and the shunted currents flow through the two switching elements Q2 and Q3, switching elements having smaller allowable currents may be employed as the respective switching elements Q2 and Q3. Alternatively, by employing switching elements having larger allowable currents as the switching elements Q2 and Q3, larger currents are allowed to flow through. In a case where the disconnection switch 70 comprises only one switching element (for example, an FET), the switching element may be required to have a larger allowable current.

When the control switch SW2 is turned off, and no bias voltage is applied to the gates of the switching elements Q2 and Q3, both of the switching elements Q2 and Q3 are turned off, and thereby the negative power supply line L2B becomes disconnected.

The thermistor 64 to detect the substrate temperature TH2 is disposed in a vicinity of the switching elements Q2 and Q3 of the disconnection switch 70. This is because the temperature of the disconnection switch 70 is increased when the discharging current flowing from the battery 50 to the main body 10 through the disconnection switch 70 becomes larger (in other words, when the battery 50 is in an overload state). That is, according to the present embodiment, the control circuit 60 is able to determine the overload state of the battery 50 based on the substrate temperature TH2 detected through the thermistor 64.

The disconnection switch 72 comprises three protection circuits F1, F2, and F3, each comprising a fuse portion 72a provided on the positive power supply line L2A, and a heater portion (more specifically, a heating resistor) 72b that generates heat due to electrical conduction to thereby melt the fuse portion 72a.

The protection circuits F1 to F3 are connected in parallel to each other so as to reduce each current flowing in each of the fuse portions 72a of the protection circuits F1 to F3 by shunting the charging current to the battery 50 or the discharging current from the battery 50. Therefore, protection circuits having smaller allowable currents may be employed as the protection circuits F1 to F3. Alternatively, by employing protection circuits having larger allowable currents as the protection circuits F1 to F3, larger currents are allowed to flow in the protection circuits F1 to F3. In a case where the disconnection switch 72 comprises only one protection circuit, the protection circuit may be required to have a larger allowable current.

In each of the protection circuits F1 to F3, one end of the heater portion 72b is connected to the positive power supply line L2A through the fuse portion 72a, and the other end of the heater portion 72b is connected to the ground line through one of the switching elements Q4 to Q6.

The switching elements Q4 to Q6 each may be an n-channel MOSFET in the same manner as the aforementioned switching elements Q1 to Q3. In this case, the drains of the switching elements Q4 to Q6 are connected to the heater portions 72b of the corresponding protection circuits F1 to F3, and the sources of the switching elements Q4 to Q6 are connected to the ground line. The gates of the switching elements Q4 to Q6 are each connected to the same output port of the control circuit 60 through one of resisters R8 to R10.

Accordingly, in the protection circuits F1 to F3, when a high-level drive signal is inputted to a corresponding one of the gates of the switching elements Q4 to Q6 from the output port of the control circuit 60 through a corresponding one of the resistors R8 to R10, and thereby a corresponding one of the switching elements Q4 to Q6 is turned on, the heater portion 72b of the protection circuit generate heat, to thereby melt the fuse portion 72a of the protection circuit.

Once the fuse portion 72a is melted, the positive power supply line L2A is disconnected, and the fuse portion 72a cannot be made conductive again thereafter. Accordingly, after the control circuit 60 disconnects the positive power supply line L2A through the protection circuits F1 to F3, the disconnected state remains and the battery pack 40 cannot be used.

A connection between the heater portion 72b of the protection circuit F1 and the drain of the switching element Q4 is connected to the negative power supply line L2B through a state determination circuit 76. The state determination circuit 76 comprises a resistor R11, a diode D4, and a Zener diode DZ1. The resistor R11 has one end connected to the drain of the switching element Q4 and the other end connected to the anode of the diode D4. The cathode of the diode D4 is connected to the negative power supply line L2B. Also, the cathode of the Zener diode DZ1 is connected to a connection point between the resistor R11 and the diode D4, whereas the anode of the Zener diode DZ1 is connected to the ground line.

The state determination circuit 76 (the resistor R11, the diode D4, and the Zener diode DZ1) is provided to determine the state (a normal state, an abnormal state) of the disconnection switch 70 and the disconnection switch 72 when the battery pack 40 is not connected to either the main body 10 or the charger 80. Specifically, it is used to confirm whether a short-circuit fault has occurred in the disconnection switch 70 and whether a disconnection failure has occurred in the disconnection switch 72.

More specifically, if the disconnection switch 70 is normal, when the disconnection switch 70 is turned off while the battery pack 40 is not connected to the main body 10 or the charger 80, a high voltage higher than a breakdown voltage of the Zener diode DZ1 is applied to the Zener diode DZ1 through the resistor R11, and a minute current flows through the Zener diode DZ1. Accordingly, an electric potential Vch at a connection point between the resistor R11 and the Zener diode DZ1 in the state determination circuit 76 becomes a high electric potential that corresponds to the breakdown voltage of the Zener diode DZ1.

In contrast, if a short-circuit fault occurs in the disconnection switch 70, a forward current flows into the diode D4 through the resistor R11, and thereby the electric potential Vch at the connection point between the resistor R11 and the diode D4 in the state determination circuit 76 (in other words, the connection point between the resistor R11 and the Zener diode DZ1) becomes a low electric potential that corresponds to a forward voltage (0.6-0.7V) of the diode D4.

In a case where the disconnection switch 72 (more specifically, the protection circuit F1) is in a normal state (in a state where the fuse portion 72a is not melted and also in a state where the heater portion 72b is connected normally), if the disconnection switch 70 is turned off while the battery pack 40 is not connected to the main body 10 or the charger 80, a high voltage higher than the breakdown voltage is applied to the Zener diode DZ1 through the resistor R11, and a minute current flows through the Zener diode DZ1. As a result, the electric potential Vch at the connection point between the resistor R11 and the Zener diode DZ1 in the state determination circuit 76 becomes a high electric potential that corresponds to the breakdown voltage of the Zener diode DZ1.

In contrast, if a disconnection failure occurs in the disconnection switch 72 (if the fuse portion 72a is melted), the disconnection switch 72 (more specifically, the protection circuit F1) and the state determination circuit 76 are electrically insulated from each other, and no current flows in the state determination circuit 76. In this case, the electric potential Vch at the connection point between the resistor R11 and the Zener diode DZ1 in the state determination circuit 76 becomes a low electric potential that corresponds to a ground potential connected through the Zener diode DZ1.

That is, if both of the disconnection switch 70 and the disconnection switch 72 are in the normal state, the electric potential Vch of the state determination circuit 76 is a high electric potential; if the disconnection switch 70 is in the abnormal state (short-circuit abnormal state) or the disconnection switch 72 is in the abnormal state (disconnection abnormal state), the electric potential Vch of the state determination circuit 76 becomes a low electric potential.

Accordingly, the control circuit 60 is able to, while the battery pack 40 is not connected to the main body 10 or the charger 80, temporarily set the control switch SW2 (and thus the disconnection switch 70) to an off state and retrieve a cathode-side electric potential (electric potential Vch) of the Zener diode DZ1 in the state determination circuit 76, and thereby perform failure determination (state determination) of the disconnection switch 70 and the disconnection switch 72.

When the battery pack 40 configured as described above is attached to the main body 10 and the trigger switch 22 is operated, the power supply path from the battery 50 to the motor 30 is formed. As a result, a current flows into the motor 30 to rotate the motor 30.

Also, when a discharging current flows from the battery pack 40 to the main body 10 and the motor 30 is driven, the control circuit 60 performs a later-described abnormality determination process (see FIG. 5) to thereby monitor the values of the cell voltages detected by the AFE 52; the value of the discharging current detected by the discharging current detection circuit 54; the value of the cell temperature TH1 detected by the thermistor 62; and the value of the substrate temperature TH2 detected by the thermistor 64.

Then, based on these monitoring results, the control circuit 60 determines whether the battery 50 is in an overload state or an over discharge state. When determining that the battery 50 is in an overload state or an over discharge state, the control circuit 60 outputs a stop command of the motor 30 to the control circuit 34 of the main body 10, to thereby turn off the switching element Q1.

After turning off the switching element Q1, the control circuit 60 determines whether discharge from the battery 50 has stopped. If the discharge from the battery 50 has not stopped, the control circuit 60 turns off the disconnection switch 70.

Since the disconnection switch 70 can be selectively turned on and off, the control circuit 60 executes, after once turning off the disconnection switch 70, a disconnection canceling process (see FIG. 6) to return the disconnection switch 70 to an on state when it is unnecessary to protect the battery 50 from overload or over discharge.

After turning off the disconnection switch 70, the control circuit 60 determines again whether the discharge from the battery 50 has stopped. If the discharge from the battery 50 has not stopped, the control circuit 60 turns off the disconnection switch 72, to thereby stop the discharge from the battery 50.

[Circuit Configuration of Charger]

Figure 4:
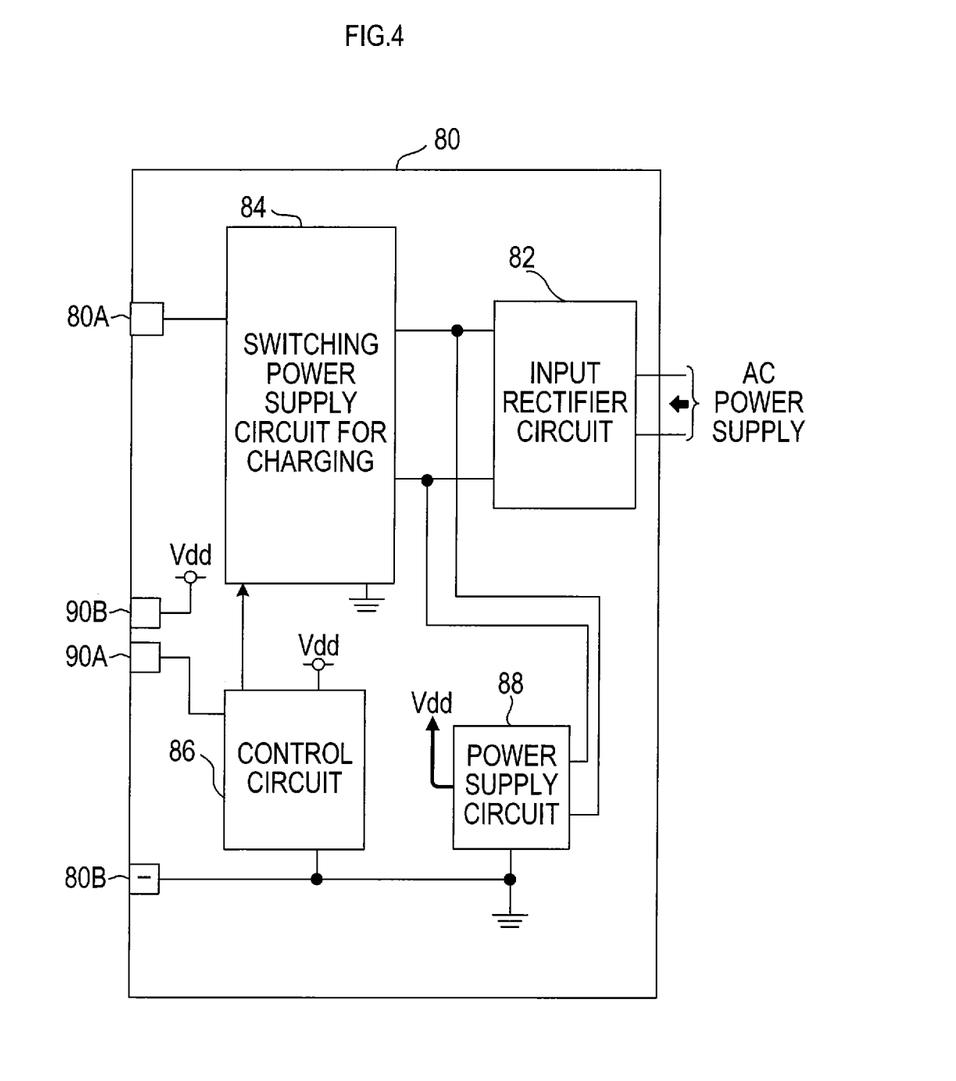
FIG. 4 is a block diagram showing a configuration of a charger to be used for charging the battery pack.

As shown in FIG. 4, the charger 80 comprises: an input rectifier circuit 82; a switching power supply circuit for charging 84; a control circuit 86, and a power supply circuit 88. The input rectifier circuit 82 rectifies an external power supply (an AC 100V power supply in the present example) to a direct current. The switching power supply circuit for charging 84 generates charging power for battery charging from the direct current power supply that is rectified by the input rectifier circuit 82. The control circuit 86 controls generation of charging power by the switching power supply circuit for charging 84 (and thus the charging to the battery 50). The power supply circuit 88 generates a power supply voltage (a direct-current constant voltage) Vdd to operate the control circuit 86 from the direct-current power supply rectified by the input rectifier circuit 82.

The control circuit 86 comprises a microcomputer, comprising a CPU, a ROM, and a RAM in a similar manner as the respective control circuits 34 and 60 in the main body 10 and the battery pack 40. When the battery pack 40 is attached to the charger 80, the control circuit 86 is connected to the control circuit 60 in the battery pack 40 through the connection terminal 90A in the charger 80 and the connection terminal 46B in the battery pack 40 to become able to perform two-way communication with the control circuit 60.

The charger 80 comprises a connection terminal 90B to apply the power supply voltage Vdd generated by the power supply circuit 88 to the connection terminal 46C of the battery pack 40 when the battery pack 40 is attached to the charger 80. The charger 80 also comprises a positive charging terminal 80A and a negative charging terminal 80B. When the battery pack 40 is attached to the charger 80, the positive charging terminal 80A is connected to the connection terminal 46D of the battery pack 40, whereas the negative charging terminal 80B is connected to the negative terminal 44B of the battery pack 40.

The positive charging terminal 80A is connected to an output line for the charging voltage from the switching power supply circuit for charging 84 to be used for applying the charging voltage to the connection terminal 46D (and thus the positive terminal 50A of the battery 50) of the battery pack 40. The negative charging terminal 80B is connected to the ground line that is common to the switching power supply circuit for charging 84.

As a result, a charging power generated by the switching power supply circuit for charging 84 is supplied to the battery 50 in the battery pack 40 through the positive charging terminal 80A and the negative charging terminal 80B.

The control circuit 86 controls the charging power from the switching power supply circuit for charging 84 until the battery 50 reaches a fully-charged state, while monitoring a charging state of the battery 50 through communication with the control circuit 60 in the battery pack 40.

[Abnormality Determination Process and Disconnection Canceling Process to be Executed in Battery Pack]

Next, a description will be given of an abnormality determination process and a disconnection canceling process to be executed by the control circuit 60 (more specifically, the CPU 60a) in the battery pack 40.

Figure 5:
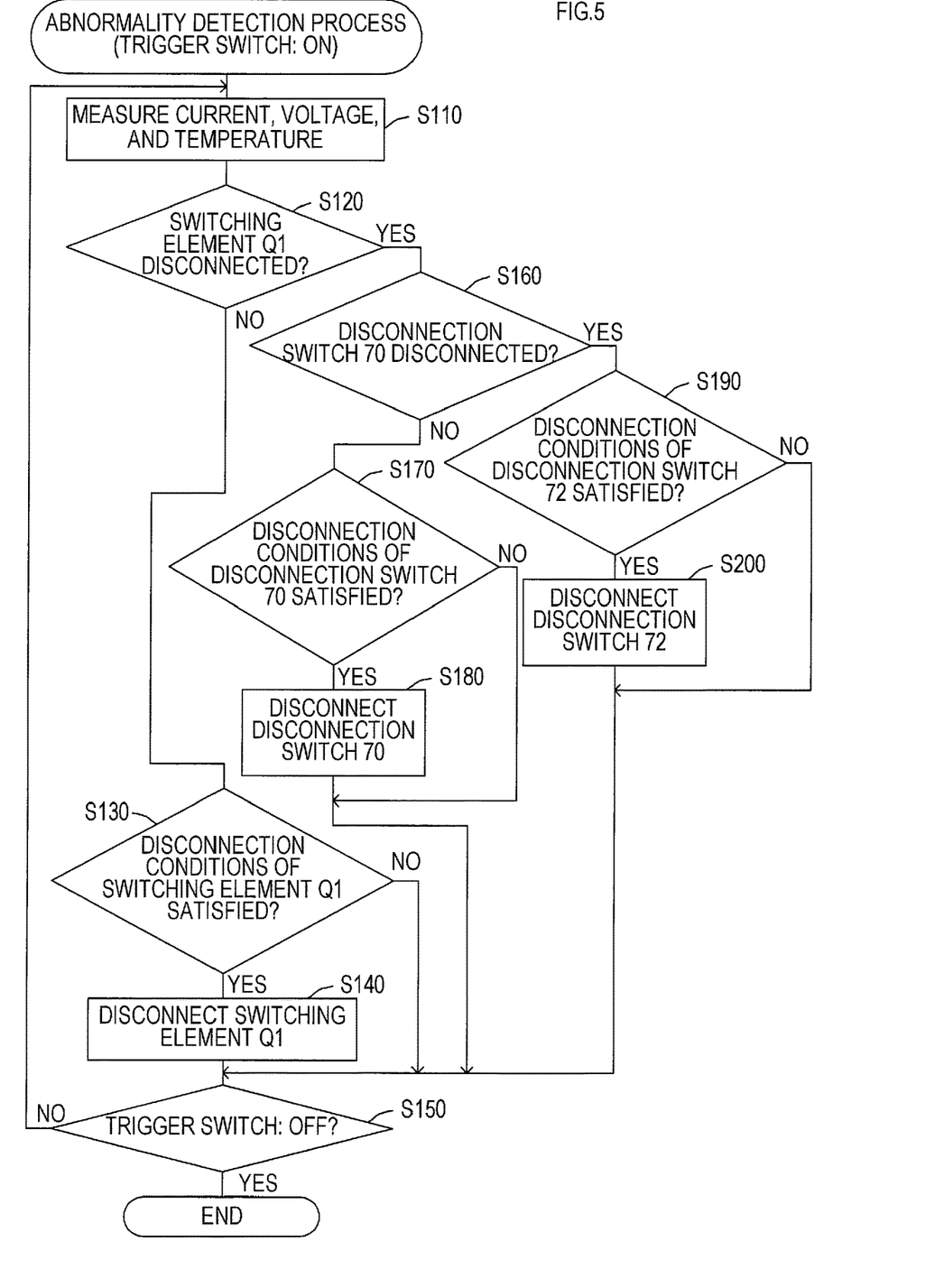
FIG. 5 is a flowchart showing an abnormality determination process to be executed by a control circuit in the battery pack.

As described above, the abnormality determination process is executed by the control circuit 60 (more specifically, the CPU 60a) in the battery pack 40 when the trigger switch 22 is operated (the trigger switch: ON) and such operation is informed from the control circuit 34 of the main body 10, while the battery pack 40 is attached to the main body 10.

In the abnormality determination process, as shown in FIG. 5, the cell voltages, the discharging current, the cell temperature TH1, and the substrate temperature TH2 are first measured in S110 (S represents "Step") through the AFE 52, the discharging current detection circuit 54, and the thermistors 62 and 64, and the present process proceeds to S120.

In S120, it is determined whether the switching element Q1, which is turned on by the drive circuit 32 in the main body 10 when the trigger switch 22 is in the on state, is already set to the disconnected state by the abnormality determination process (later-described S140).

If the switching element Q1 is not set to the disconnected state, the present process proceeds to S130, in which it is determined whether disconnection conditions of the switching element Q1 are satisfied.

The disconnection conditions of the switching element Q1 include, for example, respective conditions set below for the cell voltages, the discharging current, the cell temperature TH1, and the substrate temperature TH2 measured in S110. When at least one of the conditions below is satisfied, the CPU 60a determines that the disconnection conditions of the switching element Q1 are satisfied.

cell voltage condition: a value of a maximum cell voltage of N cells (N is a natural number of 2 or more) is less than 3.0V for a continuous one-second period discharging current condition: a counted value to be updated according to the magnitude of the discharging current is a counted value when the discharging current of 50 A flows for ten seconds cell temperature condition: a cell temperature of 60° C. or greater is detected for a continuous one-second period substrate temperature condition: a substrate temperature of 50° C. or greater is detected for a continuous one-second period The cell voltage condition is a condition to determine reduction of the cell voltage due to an over discharge of the battery 50, and the discharging current condition is a condition to determine increase of the discharging current due to an overload on the motor 30. Based on these conditions, an over discharge and an overload can be determined.

The cell temperature condition and the substrate temperature condition are conditions to determine a temperature rise of the cell and the substrate due to an over discharge and an overload, an over discharge and an overload can be determined based on these conditions.

Next, if it is determined in S130 that the disconnection conditions of the switching element Q1 are satisfied, the present process proceeds to S140, in which the switching element Q1 is forcibly disconnected by transmitting a command to turn off the switching element Q1 to the control circuit 34 in the main body 10. As a result, if the switching element Q1 and the drive circuit 32 thereof are normal, the power supply path to the motor 30 is disconnected by the switching element Q1, and thereby discharge from the battery 50 is stopped to allow protection of the battery 50 from overcharge and overload.

In a case where the switching element Q1 is disconnected in S140, or in a case where it is determined in S130 that the disconnection conditions of the switching element Q1 are not satisfied, the present process proceeds to S150, in which it is determined whether the trigger switch 22 is turned off. If it is determined in S150 that the trigger switch 22 is turned off, the present abnormality determination process is terminated; if it is determined that the trigger switch 22 is not turned off, the present process proceeds to S110 again.

If it is determined in S120 that the switching element Q1 is set to the disconnected state, the present process proceeds to S160, in which it is determined whether the disconnection switch 70 is set to the disconnected state. If the disconnection switch 70 is not set to the disconnected state, the present process proceeds to S170, in which it is determined whether the disconnection conditions of the disconnection switch 70 are satisfied.

The disconnection conditions of the disconnection switch 70 include, for example, respective conditions set below for the cell voltages, the discharging current, the cell temperature TH1, and the substrate temperature TH2 measured in S110. When at least one of the conditions below is satisfied, the CPU 60a determines that the disconnection conditions of the disconnection switch 70 are satisfied.

cell voltage condition: a value of a maximum cell voltage of N cells is less than 2.5V for a continuous two-second period
  discharging current condition: a counted value to be updated according to the magnitude of the discharging current is a counted value when the discharging current of 50 A flows for eleven seconds
  cell temperature condition: a cell temperature of 70° C. or greater is detected for a continuous one-second period
  substrate temperature condition: a substrate temperature of 60° C. or greater is detected for a continuous one-second period In the disconnection conditions of the disconnection switch 70, parameters, such as a value of voltage, a value of current, a value of temperature, and time, which are determination thresholds, are set to values that are less easily reached than the values in the disconnection conditions of the switching element Q1. This is because it is assumed that the disconnection conditions of the switching element Q1 are satisfied immediately after the power supply path to the motor 30 is disconnected by the switching element Q1.

That is, if the disconnection conditions of the disconnection switch 70 are the same as the disconnection conditions of the switching element Q1, it may occur that the disconnection conditions of the disconnection switch 70 are determined to be satisfied and thus the disconnection switch 70 becomes disconnected although the power supply path to the motor 30 is already disconnected by the switching element Q1.

According to the present embodiment, therefore, the disconnection conditions of the disconnection switch 70 are set to be less easily satisfied than the disconnection conditions of the switching element Q1, in order to allow determination in S170 that the discharge from the battery 50 has not stopped although the switching element Q1 is set to the disconnected state in S140.

If it is determined in S170 that the disconnection conditions of the disconnection switch 70 are satisfied, the present process proceeds to S180, in which the control switch SW2 is set from a normal on state to the off state to thereby disconnect the disconnection switch 70.

Accordingly, in a case where the discharge from the battery 50 continues through the power supply path to the motor 30 although the switching element Q1 is set to the disconnected state, it is possible to disconnect the power supply path by disconnecting the disconnection switch 70 to thereby protect the battery 50 from over discharge and overload.

If the disconnection switch 70 is disconnected in S180, or if it is determined in S170 that the disconnection conditions of the disconnection switch 70 are not satisfied, the present process proceeds to the aforementioned S150, in which it is determined whether the trigger switch 22 is turned off.

If it is determined in S160 that the disconnection switch 70 is set to the disconnected state, the present process proceeds to S190, in which it is determined whether disconnection conditions of the disconnection switch 72 are satisfied.

The disconnection conditions of the disconnection switch 72 include, for example, respective conditions set below for the cell voltages, the discharging current, the cell temperature TH1, and the substrate temperature TH2 measured in S110. When at least one of the conditions below is satisfied, the CPU 60a determines that the disconnection conditions of the disconnection switch 72 are satisfied.

cell voltage condition: a value of a maximum cell voltage of N cells is less than 2.5V for a continuous three-second period
  discharging current condition: a counted value to be updated according to the magnitude of the discharging current is a counted value when the discharging current of 50 A flows for twelve seconds
  cell temperature condition: a cell temperature of 80° C. or greater is detected for a continuous one-second period
  substrate temperature condition: a substrate temperature of 70° C. or greater is detected for a continuous one-second period In the disconnection conditions of the disconnection switch 72, parameters, such as a value of voltage, a value of current, a value of temperature, and time, which are determination thresholds, are set to values that are less easily reached than the values in the disconnection conditions of the disconnection switch 70. This is because it is assumed that the disconnection conditions of the disconnection switch 70 are satisfied immediately after the power supply path to the motor 30 is disconnected by the disconnection switch 70 based on satisfaction of the disconnection conditions of the disconnection switch 70.

That is, if the disconnection conditions of the disconnection switch 72 are the same as the disconnection conditions of the switching element Q1 or the disconnection switch 70, it may occur that the disconnection conditions of the disconnection switch 72 are determined to be satisfied and thus the disconnection switch 72 becomes disconnected although the power supply path to the motor 30 is already disconnected by the disconnection switch 70.

According to the present embodiment, therefore, the disconnection conditions of the disconnection switch 72 are set to be less easily satisfied than the disconnection conditions of the switching element Q1 and the disconnection switch 70, in order to allow determination in S190 that the discharge from the battery 50 has not stopped although the disconnection switch 70 is set to the disconnected state in S180.

If it is determined in S190 that the disconnection conditions of the disconnection switch 72 are satisfied, the present process proceeds to S200, in which a drive signal (a voltage signal having a high-level logical value) is outputted to the switching elements Q4 to Q6 to set each of the switching elements Q4 to Q6 from a normal off state to an on state, to thereby disconnect the protection circuits F1 to F3, which the disconnection switch 72 comprises.

Accordingly, in a case where the discharge from the battery 50 continues through the power supply path to the motor 30 although the switching element Q1 and the disconnection switch 70 are set to the disconnected state, it is possible to melt the fuse portions 72a in the protection circuits F1 to F3, which the disconnection switch 72 comprises, to thereby prevent use of the battery pack 40.

If the disconnection switch 72 is disconnected in S200, or if it is determined in S190 that the disconnection conditions of the disconnection switch 70 are not satisfied, the present process proceeds to the aforementioned S150, in which it is determined whether the trigger switch 22 is turned off.

If the disconnection switch 72 is disconnected in S200, since the fuse portions 72a in the protection circuits F1 to F3 are melted, the discharge path from the battery 50 to the motor 30 is not formed even if the trigger switch 22 is operated thereafter, and thus the motor 30 will not rotate.

In contrast, the disconnection switch 70, which is once set to the disconnected state, can be returned to a conductive state by an output from the control circuit 60. In a case where the disconnection switch 70 is disconnected in S180, if the control circuit 60 thereafter attempts to return the disconnection switch 70 to the conductive state when a specified returning condition, such as a temperature decrease, is satisfied while the battery pack 40 is attached to the main body 10, the motor 30 becomes drivable by an operation of the trigger switch 22.

Figure 6:
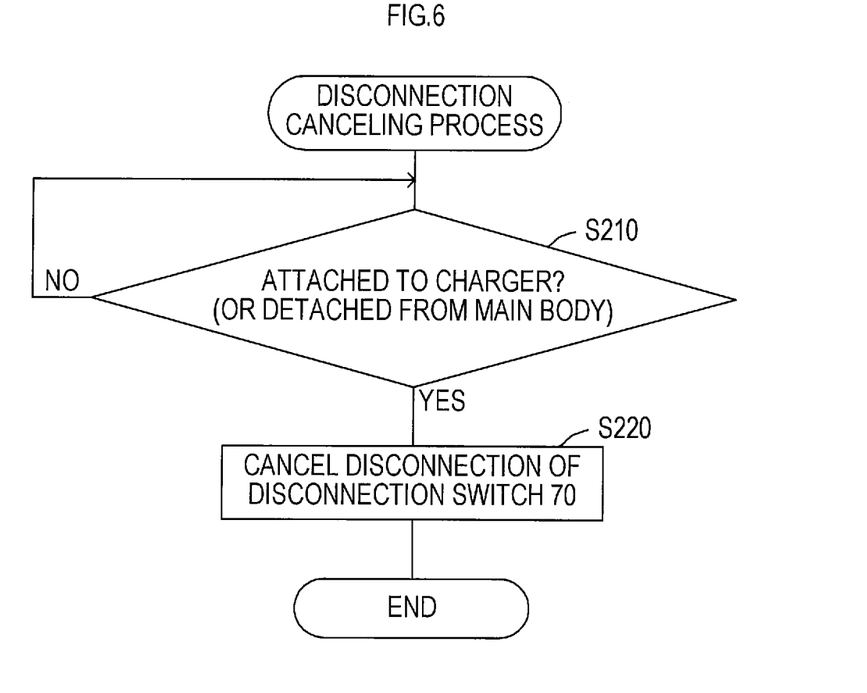
FIG. 6 is a flowchart showing a disconnection canceling process to be executed by the control circuit in the battery pack.

Accordingly, after disconnecting the disconnection switch 70 in S180, the control circuit 60 executes the disconnection canceling process shown in FIG. 6 to thereby cancel disconnection of the disconnection switch 70 when the battery pack 40 is detached from the main body 10 and attached to the charger 80.

In the disconnection canceling process, as shown in FIG. 6, it is determined in S210 whether the battery pack 40 is attached to the charger 80 based on an input signal from the charger detection circuit 68. If the battery pack 40 is not attached to the charger 80, the determination process in S210 is executed repeatedly until the battery pack 40 is attached to the charger 80.

When it is determined in S210 that the battery pack 40 is attached to the charger 80, the present process proceeds to S220, in which the control switch SW2 is set from the off state to the on state to thereby cancel disconnection of the disconnection switch 70 (that is, to make the disconnection switch 70 conductive), and then the present disconnection canceling process is terminated.

As described above, in the electric power tool 1 of the present embodiment, if the disconnection conditions of the switching element Q1 are satisfied while the motor 30 is driven as a result of operation of the trigger switch 22, the power supply path to the motor 30 is disconnected by the switching element Q1 (S130, S140).

After the power supply path is disconnected by the switching element Q1, it is determined whether the disconnection conditions of the disconnection switch 70 are satisfied (more specifically, whether the discharge from the battery 50 has stopped). If the discharge from the battery 50 has not stopped, the power supply path is disconnected by the disconnection switch 70 (S170, S180).

Accordingly, if the power supply path cannot be disconnected by the switching element Q1 during an overload or an over discharge of the battery 50, it is possible to disconnect the power supply path by the disconnection switch 70 to thereby stop the discharge from the battery 50 and protect the battery 50.

After the power supply path is disconnected by the disconnection switch 70, it is determined whether the disconnection conditions of the disconnection switch 72 are satisfied (more specifically, whether the discharge from the battery 50 has stopped). If the discharge from the battery 50 has not stopped, the power supply path is disconnected by the disconnection switch 72 (S190, S200).

Accordingly, if the power supply path cannot be disconnected by the disconnection switch 70, it is possible to disconnect the power supply path by the disconnection switch 72 to thereby stop the discharge from the battery 50 to the motor 30 and inhibit or prevent burnout of the motor 30.

Also, if the power supply path cannot be disconnected by the disconnection switch 70, it is possible to melt the fuse portions 72a in the protection circuits F1 to F3, which the disconnection switch 72 comprises, to thereby inhibit use of the battery pack 40. This allows to inhibit or prevent reduction in safety of the electric power tool 1 that may result from reuse of the battery pack 40 with the broken disconnection switch 70.

According to the present embodiment, if an abnormality, such as over discharge or overload, is detected, safety at the time of failure of the switching element Q1 and the disconnection switch 70 will not be secured by simultaneously disconnecting both of the switching element Q1 and the disconnection switch 70. According to the present embodiment, the switching element Q1 is preferentially disconnected when an abnormality is detected, and the disconnection switch 70 is disconnected in a case where the discharge from the battery 50 has not stopped although the switching element Q1 is disconnected. As a result, it is possible to reduce the frequency of disconnecting the power supply path by the disconnection switch 70 and thus to reduce the failure occurrence rate of the disconnection switch 70.

According to the present embodiment, the disconnection conditions of the switching element Q1, the disconnection switch 70, and the disconnection switch 72 are set based not only on the detected values of current, voltage, temperature, and the like, but also on respective continued times of the detected values (in other words, temporal changes). Thus, an over discharge or an overload can be detected more accurately.

Also, according to the present embodiment, since respective disconnection conditions of the switching element Q1, the disconnection switch 70, and the disconnection switch 72 are different from one another, it is possible to correctly determine the discharge from the battery 50 after the power supply path is disconnected by the switching element Q1 or the disconnection switch 70.

Accordingly, it is possible to reduce the frequency of disconnection by the disconnection switch 70 to thereby reduce deterioration of the disconnection switch 70, and to reduce or prevent misdetermination of the discharge from the battery 50, which will result in disconnection of the disconnection switch 72 and disabled use of the battery pack 40.

In a case where the disconnection switch 70 is disconnected, the disconnection switch 70 is set to the conductive state when the battery pack 40 is thereafter detached from the main body 10 and then attached to the charger 80. This inhibits or prevents the motor 30 from becoming drivable while the battery pack 40 is attached to the main body 10, and thus achieves improved safety.

In the present embodiment, the motor 30 corresponds to an example of an actuator of the present disclosure; the switching element Q1 corresponds to an example of a first disconnection unit of the present disclosure; the disconnection switch 70 corresponds to an example of a second disconnection unit of the present disclosure; and the disconnection switch 72 corresponds to an example of a third disconnection unit of the present disclosure.

Also, the control circuit 60 in the battery pack 40 corresponds to an example of an abnormality detection unit and a control unit of the present disclosure. The function as the abnormality detection unit is achieved by the processes in S160 to S200 executed in the abnormality determination process shown in FIG. 5 and the disconnection canceling process shown in FIG. 6. Further, the state determination circuit 76 in the battery pack 40 corresponds to an example of a state determination unit of the present disclosure.

Although one embodiment of the present disclosure has been described above, the present disclosure should not be limited to the above embodiment but may be in various forms within the scope not departing from the spirit of the present disclosure.

For example, disconnection of the disconnection switch 70, which is an example of the second disconnection unit, is cancelled when the battery pack 40 is attached to the charger 80 in the above embodiment. However, disconnection of the disconnection switch 70 may be cancelled when the battery pack 40 is detached from the main body 10. In this case, the control circuit 60 in the battery pack 40 may detect that the battery pack 40 is detached from the main body 10 by means of communication with the control circuit 34 in the main body 10 or by means of a sensor, or the like. Also in this case, the disconnection canceling process shown in FIG. 6 may be such that it is determined in S210 whether the battery pack 40 is detached from the main body 10, and if the battery pack 40 is detached from the main body 10, the process proceeds to S220, in which disconnection of the disconnection switch 70 is cancelled.

In the above described embodiment, in the abnormality determination process shown in FIG. 5, if it is determined that the disconnection conditions of the disconnection switch 72 are satisfied (S190: YES), the switching elements Q4 to Q6 are set to the on state in S200 to thereby disconnect the protection circuits F1 to F3, which the disconnection switch 72 comprises. However, if the battery voltage of the battery 50 is reduced due to the discharge thereof, a sufficient current cannot flow in the heater portions 72b of the protection circuits F1 to F3, which may result in a reduced heat generation amount of the heater portions 72b and in a failure in melting the fuse portions 72a.

Figure 7A:
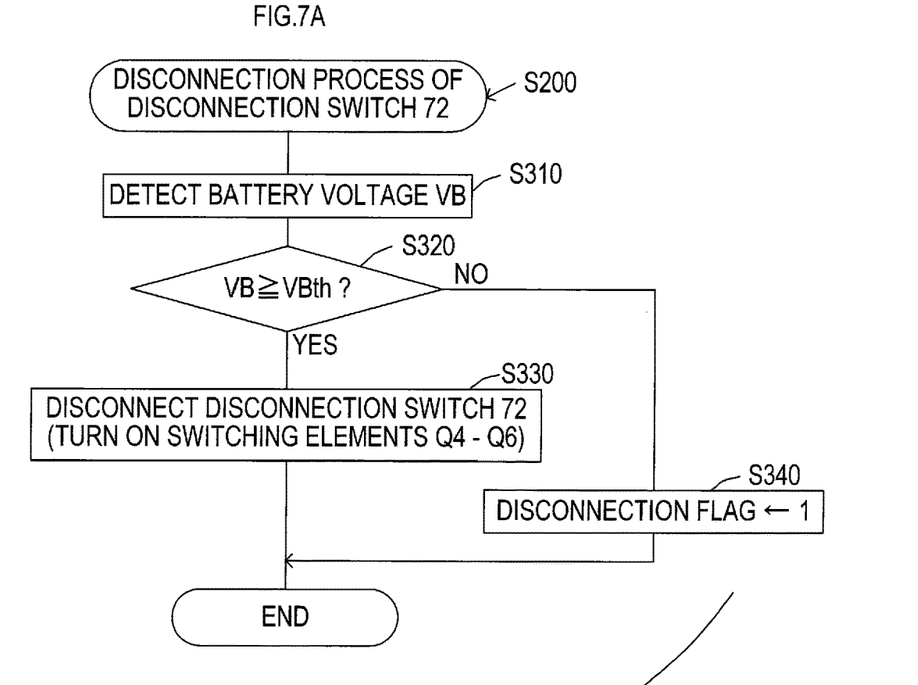
FIGS. 7A and 7B are flowcharts showing a modified example of the abnormality determination process.

To reduce or prevent such trouble, the disconnection process of the disconnection switch 72 in S200 of FIG. 5 may be executed as shown in FIG. 7A. In the disconnection process, an interruption process shown in FIG. 7B may be executed when a disconnection flag is set to a value of "1".

Specifically, in the disconnection process of the disconnection switch 72 in S200, a value of a battery voltage VB is first detected in S310 through the battery voltage detection circuit 58, and it is determined in S320 whether the value of the battery voltage VB is equal to or greater than a preset value of a determination voltage VBth. The value of the determination voltage VBth is a value of a lower limit voltage that can supply electric power enough to melt the fuse portions 72a from the battery 50 to the heater portions 72b and is preset based on, for example, an experiment.

If it is determined in S320 that the value of the battery voltage VB is equal to or greater than the value of the determination voltage VBth, the present process proceeds to S330, in which the switching elements Q4 to Q6 are set from the off state to the on state to thereby supply current to the heater portions 72b in the protection circuits F1 to F3 and to melt the fuse portions 72a. Then, the disconnection process is terminated.

If it is determined in S320 that the value of the battery voltage VB is less than the value of the determination voltage VBth, the present process proceeds to S340, in which it is stored in a flash ROM 60d to disconnect the disconnection switch 72 by setting the disconnection flag to "1". Then, the disconnection process is terminated.

Figure 7B:
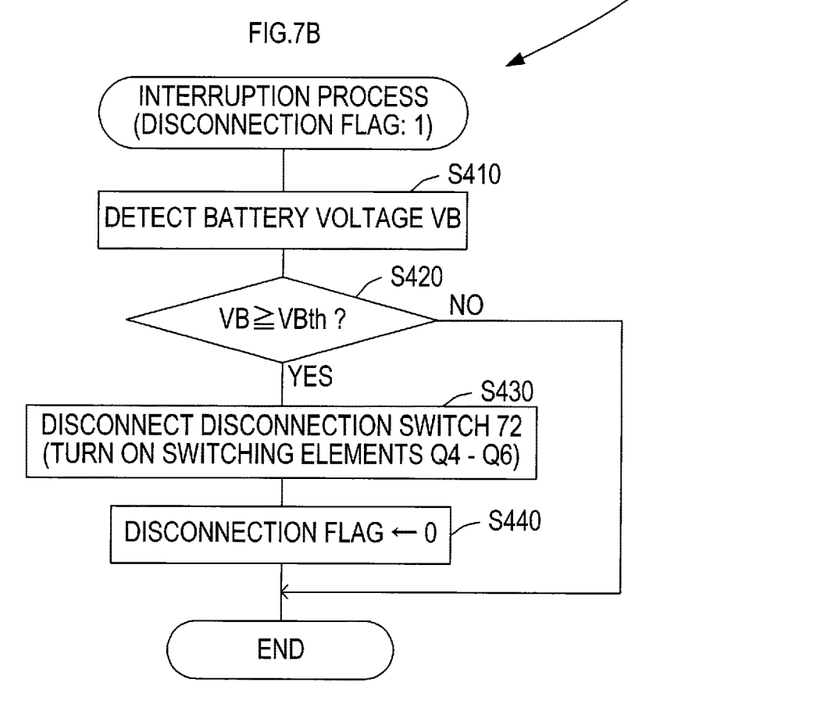

If the disconnection flag is set to "1", the interruption process shown in FIG. 7B is executed in the control circuit 60 at specified time intervals. In the interruption process, the value of the battery voltage VB is first detected in S410 through the battery voltage detection circuit 58, and it is determined in S420 whether the value of the battery voltage VB is equal to or greater than the aforementioned value of the determination voltage VBth. If the value of the battery voltage VB is not equal to or greater than the value of the determination voltage VBth, the present interruption process is immediately terminated.

On the other hand, if the value of the battery voltage VB is equal to or greater than the value of the determination voltage VBth, the present process proceeds to S430. In S430, the switching elements Q4 to Q6 are set from the off state to the on state to thereby melt the fuse portions 72a. In S440, the disconnection flag in the flash ROM 60d is set to a value of "0" (i.e., the disconnection flag is reset), and then the present interruption process is terminated.

According to the disconnection process of the disconnection switch 72 and the interruption process executed as described above, even if the disconnection switch 72 cannot be disconnected due to a reduce of the battery voltage VB while executing the abnormality determination process in FIG. 5, the disconnection switch 72 can be disconnected when the value of the battery voltage VB thereafter returns to the value of the determination voltage VBth or greater.

In the above embodiment, the disconnection switch 70 comprises two switching elements Q2 and Q3 that are connected in parallel to each other, and the disconnection switch 72 comprises three protection circuits F1 to F3 that are connected in parallel to one another. This is to allow a certain amount of current to flow through each of the disconnection switches. Accordingly, each of the disconnection switches 70 and 72 may comprise a single switching element or a single protection circuit in a case where the single switching element or the single protection circuit allows flow of an amount of current required to drive the motor 30.

In the above embodiment, a time period during which the discharging current is equal to or greater than a specified value is set as the discharging current condition to determine whether the discharge from the battery 50 has stopped after the switching element Q1 or the disconnection switch 70 is disconnected. This allows determination of whether the discharge has stopped based on the temporal change of the discharging current. However, once the discharge from the battery 50 has stopped, the discharging current rapidly decreases and eventually reaches zero. Accordingly, the temporal change of a detected value, such as in the case of the cell voltage (the battery voltage), the cell temperature, the substrate temperature (the temperature of the electric power tool), or the like, is not always required to be set as the discharging current condition; only a threshold of the discharging current may be set as the discharging current condition. That is, a determination of whether the discharge has stopped may be made based on a determination of whether the value of the discharging current has reached or fallen below a threshold.

Although the present disclosure is applied to an electric power tool in the above embodiment, the present disclosure may be applied to any electrically-driven working apparatus that operates receiving power supply from a battery, such as a rechargeable vacuum cleaner or a rechargeable grass cutter, in the similar manner as in the above embodiment. The present disclosure may also be applied to an electrically-driven working apparatus provided with an actuator (for example, a solenoid) other than a motor.

A battery need not be formed separately from a main body of an electrically-driven working apparatus, like the battery pack 40 and the main body 10 in the above embodiment, and the present disclosure may be applied to an electrically-driven working apparatus with a built-in battery.

What is claimed is:

1. A battery pack comprising:
    a battery;
    an abnormality detector configured to detect either an overload or an over discharge of the battery;
    a power supply path configured to electrically couple the battery to an electrically-driven working apparatus that is coupled to the battery pack;
    a disconnector provided in the power supply path to be operable to disconnect the power supply path, the disconnector including at least one protection circuit, the at least one protection circuit including a fuse portion and a heater portion, the fuse portion being configured to disconnect the power supply path by melting, and the heater portion being configured to generate heat by electrical conduction to thereby melt the fuse portion; and
    a controller configured to activate the disconnector, in response to the abnormality detector detecting the overload or the over discharge, to thereby disconnect the power supply path, the controller being configured to output a stop command to the electrically-driven working apparatus, in response to the abnormality detector detecting the overload or the over discharge, to thereby turn off a switching element provided in a discharge path in the electrically-driven working apparatus, the controller being configured to determine, after the controller outputs the stop command, whether discharge from the battery is stopped based on a current flowing in the power supply path and/or a change in temperature of one of the battery and the electrically-driven working apparatus, and the controller being configured to cause electrical conduction from the battery to the heater portion, in response to the controller determining that the discharge is not stopped, to thereby melt the fuse portion.

2. The battery pack according to claim 1,
    wherein the abnormality detector is configured to detect either the overload or the over discharge in response to a first condition being satisfied,
    wherein the controller is configured to determine, after the controller outputs the stop command, whether a second condition is satisfied,
    wherein the controller is further configured to cause electrical conduction from the battery to the heater portion, in response to the second condition being satisfied, to thereby melt the fuse portion, and
    wherein the second condition is more difficult to be satisfied than the first condition.

3. The battery pack according to claim 1,
    wherein the at least one protection circuit includes a plurality of protection circuits coupled in parallel to one another.

4. The battery pack according to claim 3,
    wherein the plurality of protection circuits includes a plurality of switching elements operable to electrically couple the battery to the heater portion, and
    wherein the controller is configured to activate the plurality of switching elements to thereby disconnect the power supply path.

5. The battery pack according to claim 1,
    wherein the abnormality detector is configured to detect the overload based on a discharge current from the battery to the electrically-driven working apparatus, and
    wherein the controller is configured to activate the disconnector, in response to the abnormality detector detecting the overload, to thereby disconnect the power supply path.

6. The battery pack according to claim 1,
    wherein the battery includes a battery cell,
    wherein the abnormality detector is configured to detect the over discharge based on a voltage of the battery cell, and
    wherein the controller is configured to activate the disconnector, in response to the abnormality detector detecting the over discharge, to thereby disconnect the power supply path.

\* \* \* \* \*